(12) United States Patent
Bhatia

(10) Patent No.: US 7,716,729 B2
(45) Date of Patent: May 11, 2010

(54) METHOD FOR RESPONDING TO DENIAL OF SERVICE ATTACKS AT THE SESSION LAYER OR ABOVE

(75) Inventor: Medhavi Bhatia, Germantown, MD (US)

(73) Assignee: Genband Inc., Plano, TX (US)

( * ) Notice: Subject to any disclaimer, the term of this patent is extended or adjusted under 35 U.S.C. 154(b) by 860 days.

(21) Appl. No.: 11/286,598

(22) Filed: Nov. 23, 2005

(65) Prior Publication Data

US 2007/0118894 A1 May 24, 2007

(51) Int. Cl.
*H04L 29/06* (2006.01)
(52) U.S. Cl. ......................................... 726/13; 713/151
(58) Field of Classification Search ........................ None
See application file for complete search history.

(56) References Cited

U.S. PATENT DOCUMENTS

| | | | |
|---|---|---|---|
| 6,321,336 B1 * | 11/2001 | Applegate et al. | 726/11 |
| 6,938,080 B1 * | 8/2005 | Kahveci et al. | 709/223 |
| 2002/0129236 A1 | 9/2002 | Nuutinen | |
| 2003/0014665 A1 * | 1/2003 | Anderson et al. | 713/201 |
| 2003/0043740 A1 * | 3/2003 | March et al. | 370/229 |
| 2003/0084329 A1 | 5/2003 | Tarquini | |
| 2003/0091042 A1 | 5/2003 | Lor | |
| 2004/0086093 A1 | 5/2004 | Schranz | |
| 2005/0022010 A1 * | 1/2005 | Swander et al. | 713/201 |
| 2005/0041648 A1 | 2/2005 | Bharatia et al. | |
| 2005/0108567 A1 | 5/2005 | D'Souza et al. | |
| 2005/0111382 A1 | 5/2005 | Le et al. | |
| 2006/0253908 A1 * | 11/2006 | Yang | 726/24 |
| 2006/0285493 A1 * | 12/2006 | Manuja et al. | 370/235 |
| 2008/0040801 A1 * | 2/2008 | Buriano et al. | 726/22 |

FOREIGN PATENT DOCUMENTS

JP 2006023934 A 1/2006

OTHER PUBLICATIONS

Jon Hardwick Session Border Controllers Enabling the VOIP Revolution Data Connection Limited Feb. 2005 pp. 38-41.*
International Search Report and Written Opinion mailed Feb. 19, 2008 for International Application No. PCT/US06/45009, 9 pages.

(Continued)

*Primary Examiner*—Emmanuel L Moise
*Assistant Examiner*—David J Pearson
(74) *Attorney, Agent, or Firm*—Jenkins, Wilson, Taylor & Hunt, P.A.

(57) ABSTRACT

In a method for responding to a denial of service attack at a higher layer of a communication network, said communication network also having a lower layer beneath the higher layer for receiving packet information from users, providing a packet filter inspection layer between the higher layer and the lower layer. By use of an application layer which is associated with or comprises said higher layer, creating a rule in the packet filter layer to identify a likely denial of service attack. By use of the packet filter inspection layer, inspecting incoming packet information to determine whether it is a likely denial of service attack, and if it is stopping the incoming packet information from being sent to the application layer. After a predetermined time period, stopping use of the rule to prevent packet information from being sent through to the application layer.

31 Claims, 5 Drawing Sheets

OTHER PUBLICATIONS

Denial of Service Attacks and SIP Infrastructure—Sisalem et al—2003.
The Real Time Transport Protocol (RTP) Denial of Service (Dos) Attack and its Prevention—pp. 1-6 Oct. 6, 2005.
Distributed Denial of Service Attacks—Prolexic Technologies—Q4: 2004.
A Review of Mobility Support Paradigms for the Internet—Deguang Le et al Jan. 2005.
White Paper—Denial of Service—Understanding Attack Techniques—Jun. 22, 2005.

* cited by examiner

FIG. 5

DoS Attack Example

```
                SIP UA        IMX Packet Filter Layer           IMX Application Layer
                 33                    55                              56
48B  WL = {204.180.228.4,
50       207.180.228.4}        50A─INVITE
52   BL = {204.180.228.5t,        54─555@IMX.net  44
         207.180.228.5}           50B─204.180.228.6
51   Rest = ALL                49─┐                    50A ─ INVITE is detected to be as part of "REST", it
                                  49A─INVITE                  is subject to rate limiting separate from the WL.
                                    54─555@IMX.net  45        This INVITE may be dropped while the
                                    49B─204.180.228.5   50A   INVITEs matching WL may simultaneously get
                                                    53              processed.
                                       53A─INVITE           49A ─ INVITE is dropped as the source IP
                                         46                       specifically matches the black list
                                    48B─204.180.228.4
                                    100                      53A ─ INVITE is passed through to the IMX application
                                                                  layer and the IMX application layer applies the
                                                                  rate limiting after that
```

METHOD FOR RESPONDING TO DENIAL OF SERVICE ATTACKS AT THE SESSION LAYER OR ABOVE

BACKGROUND

Attacks on Internet communication networks known as a "Denial of Service" (DoS) attacks are a serious problem. Examples of some widely known DoS attacks are Teardrop, TCP SYN Flood, Smurf, Buffer Overflow etc. Each of these attacks can be mapped to one of the seven layers of the OSI model: By way of background, the "Open Systems Interconnection" protocol (OSI) comprises a seven layer model: Application (layer 7); presentation (layer 6); session (layer 5); transport (layer 4); network (layer 3); data link (layer 2); and physical (layer 1). The Teardrop attack targets the Network Layer, TCP SYN Flood and Smurf attacks target the transport Layer. Some buffer overflow attacks target higher layer protocols. In "Voice over Internet Protocol" (VoIP) systems, an attack could occur at the higher session layer utilizing vulnerabilities inside "Session Internet Protocol" (SIP), H.323, MGCP, or Megaco etc. The attack could also occur at the higher application layer. We will take SIP as an example: An attack on the session and application layers using SIP may comprise the following scenarios. SIP packets are received from an SIP entity or a group of SIP entities:

- where packets are malformed; i.e., they are not formed in accordance with well known, expected and legal SIP grammar (session layer);
- packets contain SIP headers or body types or parameters which are legal but which exploit a vulnerability on an end point or server to which they are directed (session layer);
- SIP registrations may come from attackers which tend to steal services from legitimate subscribers or devices (application layer);
- packets may simply be sent at a higher rate to exhaust either the intermediate servers or the end devices which are targeted (session layer).

For VoIP, so-called "user agents" (UA) operating at the application layer send and receive information packets by use of the Session Internet Protocol (SIP), H.323, MGCP, Megaco etc. SIP is by far the most commonly used protocol for VoIP based communications.

Current solutions for DoS attacks implement network and/or transport layer 3/4 based solutions for VoIP and other application traffic. However, in most cases, existing layer 3/4 systems to prevent DoS attacks may not be able to thwart the attack since the attack is not "visible" at the L3/L4 level (e.g. SIP and SDP based applications operates at the session layer 5 and above). Most attacks may not show a pattern at layer 3 and 4 or may not be detectable as a packet rate based attacks. Also, the L3/L4 address may be variable while the session layer and application layer identity (like username/password) indicated hereafter as the Address-of-Record (A-O-R)) may be the same. For example, the attacker may move frequently in the network across wireless hotspots and issue the same attack from different L3/L4 domains An attacker may also launch a multitude of rate based attacks from mobile locations. Only the application layer has the information which L3/L4 identities have been authenticated. A simple L3/L4 based solution would allow the attacker to steal scarce network resources from authenticated users. An extreme example is an E911 DoS Attack, where the attacker sends packets which look like emergency calls to the server and a Public Safety Access Point (PSAP) to inundate them with fake calls. The system may thus be unable to process valid E911 calls from a real disaster zone.

In another scenario, a legitimate user may be unaware of bugs or viruses in a software he/she downloads from the Internet. The attacker may send traffic towards another user in a P2P (peer-to-peer) session, which may crash or cause unpredictable behavior on the peer user. The downloaded software may be authentic or may have been compromised.

In the above, a situation has been described in which it is not possible to pin the attacker to a unique L3/L4 address because the attacker may be mobile.

There is another case when it is hard to pinpoint a unique association between the attacker and a L3/L4 address. For example, an attacker who hacks into a VoIP "Private Branch Exchange" (PBX) and assumes the identity of one or more users by gaining access to their user ID and password. The attacker then initiates the attack by mixing malicious calls among authentic calls. Such an attack cannot be prevented simply by a L3/L4 based solution without blocking service to the entire set of users behind that PBX (thus denying service as well). Thus previous layer 3/4 solutions can be ineffective and impractical.

SUMMARY

It is an object to provide a method for improved response to denial of service (DoS) attacks.

In a method for responding to a denial of service attack at a higher layer of a communication network, said communication network also having a lower layer beneath the higher layer for receiving packet information from users, providing a packet filter inspection layer between the higher layer and the lower layer. By use of an application layer which is associated with or comprises said higher layer, creating a rule in the packet filter layer to identify a likely denial of service attack. By use of the packet filter inspection layer, inspecting incoming packet information to determine whether it is a likely denial of service attack, and if it is stopping the incoming packet information from being sent to the application layer. After a predetermined time period, stopping use of the rule to prevent packet information from being sent through to the application layer.

BRIEF DESCRIPTION OF THE DRAWINGS

FIG. 5 is a diagram example showing how the WL and BL lists are used by the packet filter layer to handle a DoS attack.

DESCRIPTION OF THE PREFERRED EMBODIMENT

Figure 1:
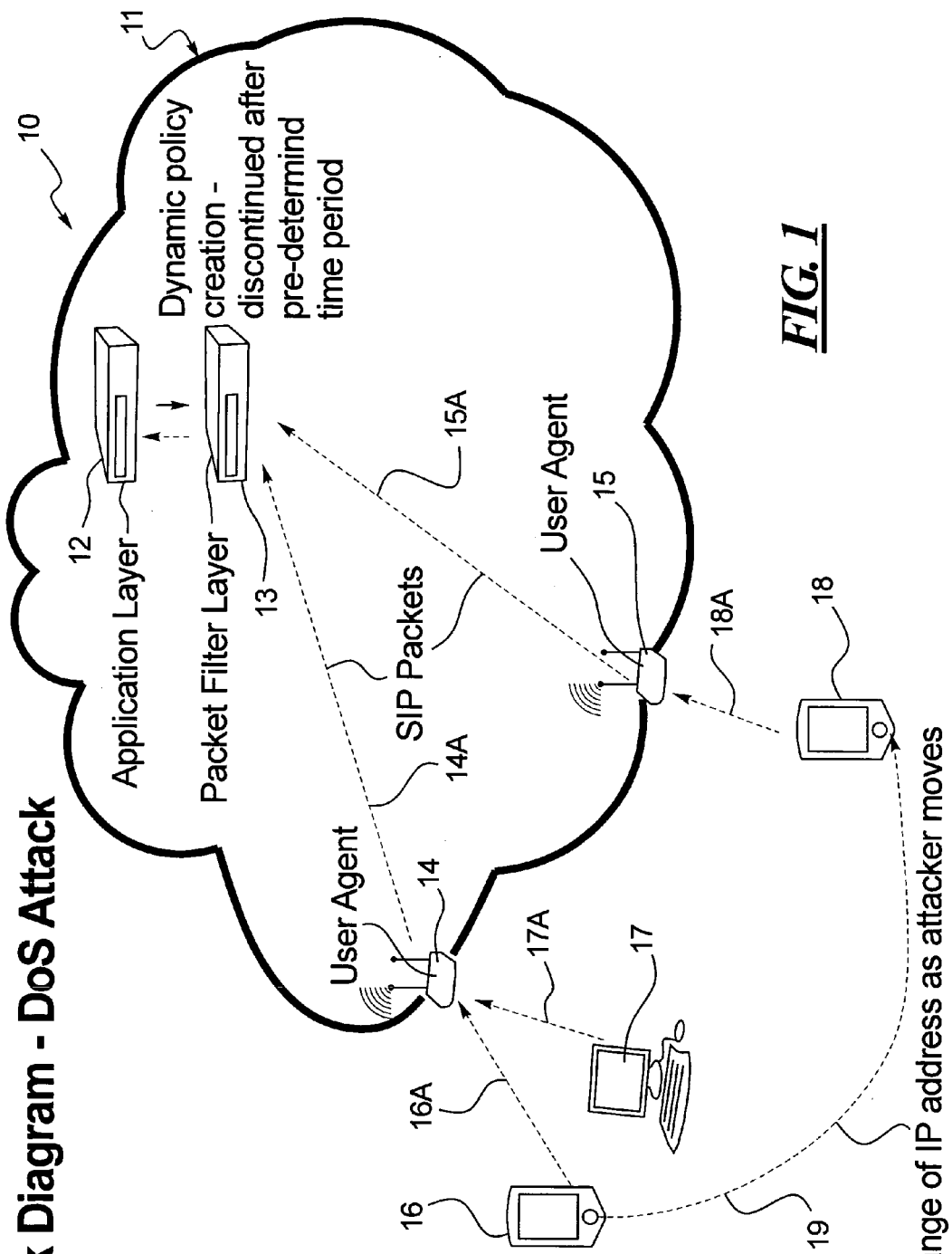
FIG. 1 is a network diagram showing a DoS attack at the application or session layer and a response to that attack according to the preferred embodiment.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

As explained hereafter, a method of the disclosed preferred embodiment can be utilized to prevent DoS attacks by thwarting bad traffic before it hits the session layer boundary itself or providing it a lower class of service until it has been authenticated.

In a method of this preferred embodiment for responding to a DoS attack, once the application determines that it or another user in the system is under attack, the user/sender's name/identification information (hereafter the so-called Address-of-Record (A-O-R) of the attacked is mapped into the user/sender's IP address. If this IP address is unique and is not used by any other user in the system, then a network/transport layer 3/4 block is implemented by use of a packet filter layer for a specified period of time. After that specified period of time, the block is released. Thus network/transport layer 3/4 incoming requests are prevented from overloading the session layer 5 authentification server's resources. If the IP address is not unique, then a special rule is installed at the packet filter layer, which is a shim layer serving as an inspection layer. This shim or inspection packet filter layer is positioned between layer 5 (the session layer) and the network/transport layers 3/4. The inspection layer inspects all packets as they are passed from layers 3/4 through the session layer 5 to the application layer 7. If the packet matches the rule (the black list), the packet is dropped. The rule is installed for a specified period of time and after that time the block is released.

With the preferred embodiment, a "Session Border Controller" (SBC) or SIP server or input which detects the DoS attack propagates this information to IP router forwarding layers and other DoS prevention devices which may be located with the SBC or located at other points of the network. As explained above, the attacker's SIP packet profile is dynamically mapped to the information which can be used to uniquely identify packets at the packet inspection layer. This information is used to either selectively allow authentic packets (white list processing), to selectively throw suspected attack packets (black list processing), or dedicate controlled resources until the packet stream is appropriately categorized as white or black. The packet inspection layer may itself be distributed in the network. The information distributed at this layer is timed and then deleted after a defined time period such as fifteen minutes, for example.

First, as an overview, attention is drawn to FIG. 1 showing a typical network diagram undergoing a DoS attack. At the outset, it should be noted that although in the disclosed preferred embodiment a DoS attack is shown on a VoIP network utilizing SIP packets, the invention is also applicable to any other type of VoIP or other Internet type network communication system, and a DoS attack on such a system. For example, the invention is also applicable to VoIP protocols other than the SIP—such as the H.323 protocol, RTSP, Megaco/MGCP, or other protocols.

As shown in FIG. 1, the communication network 10 utilizes the Internet 11 to connect user agents 14, 15 (users) by SIP packets in a VoIP example to the packet filter layer 13 located below the application layer 12, but above the network and transport layers 3/4 not shown.

In FIG. 1, an attacker may move from an attack location 16 using attack path 16A to an attack location 18 using attack path 18A along line 19, so that a change of the Internet protocol (IP) address occurs as the attacker moves. Also, an attacker may launch an attack from a computer 17 along attach path 17A.

As explained in more detail hereafter and as shown in FIG. 1, by interaction with the application layer 12, a dynamic policy creation occurs used by the packet filter layer for responding to the DoS attacks. Significantly, the policy creation is discontinued by the packet filter layer after a predetermined time period so that a large number of user agents are not blocked by an SIP attack and normal communications may proceed.

Figure 2:
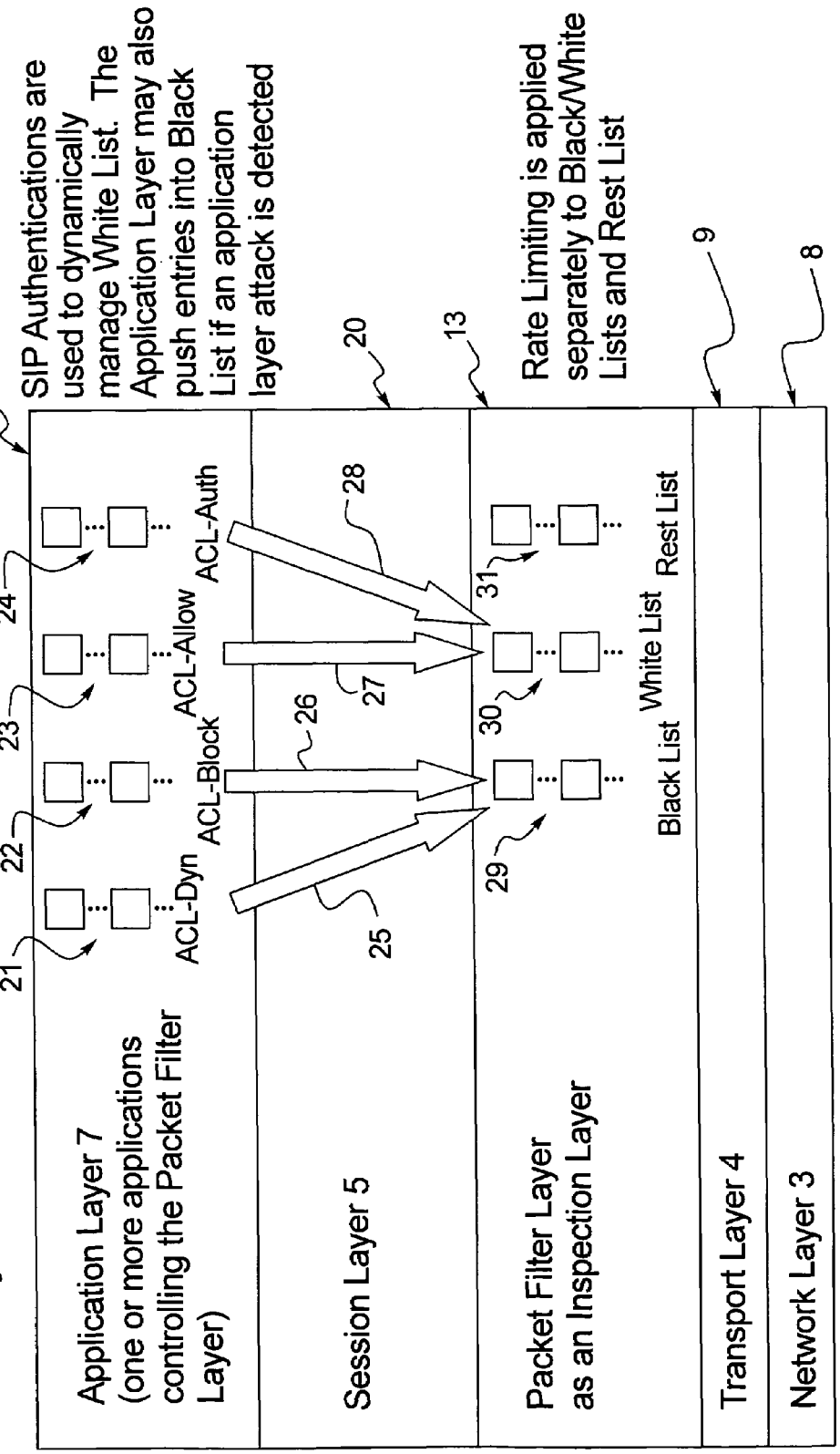
FIG. 2 is a diagram illustrating application layer DoS prevention architecture utilizing a packet filter layer and specifically shows dynamic creation of the so-called "White List" (WL) and "Black List" (BL)

The application layer DoS prevention architecture of the present preferred embodiment will now be discussed in reference to FIG. 2. This drawing figure shows how SIP authentications (registrations) are used to dynamically create and manage a white list. Creation and management of such a white list is discussed in FIG. 3 hereafter. As also shown in FIG. 2, the application layer may also push entries into a black list if an application attack is detected. Creation and management of the black list is discussed hereafter in reference to FIG. 4.

In FIG. 2 the application layer 12 is shown with one or more applications controlling the packet filter layer 13 through the session layer 20 (the presentation layer 6 is not shown in FIG. 2). The packet filter layer 13 is "shimmed" or inserted as an inspection layer between the application session layers 12, 20 lying above, and the network/transport layers 8, 9 lying below. Four kinds of "Access Control Lists" (ACL) 21, 22, 23 and 24 are shown. In these lists, a plurality of-boxes are illustrated with each box representing a user/sender IP address entry.

In the general form, the packet filter layer entries which may have one or more of the following pieces of information (so-called "rules") to filter packets with: (i) IP address (like A.B.C.D) as shown in list form as black and white lists 29 and 30 in FIG. 2; (ii) a protocol (like TCP, UDP etc.); (iii) a network layer 4 port (like 50000); (iv) an arbitrary pattern in the network layer 4 payload (like joe@imx.net); and/or (v) any other piece of information (rule) useful for detecting a denial of service attack. Once a packet arrives, it is examined for a match against this information in each entry (where one or more of the pieces may be specified as "and" or "or") and a policy is applied which matches this entry. The policy may be one of the following: (i) drop the packet; (ii) process the packet at a lower priority; and/or (iii) control the packet rate according to a burst/peak rate etc. This method highlights how these entries are created rather than the content of each entry itself or the policy it specifies. For the purposes of illustrating the method, the preferred embodiment is based on the assumption that the entry is an IP address list only.

The disclosed procedures may also be used by the application layer to create a similar shim layer between the application layer and the session layer or by the session layer between itself and L3/L4. Multiple shim layers such as those created by the disclosed method may be provided concurrently as well. The disclosed example illustrates a single shim layer provided by the application layer and session layers between the session layer and L3/L4.

Now returning to the description of FIG. 2, the ACL-Dynamic list (ACL-Dyn) 21 allows IP sender address entries to be dynamically pushed from the application layer 12 through the signaling layer 20 (session layer 5 in the OSI model) along path 25 to the inserted packet filter layer 13, and specifically to the black list 29. The black list has IP sender addresses likely to be responsible for future DoS application attacks since for example, attacks from these IP addresses were previously detected.

The ACL-Block list 22 controls the black list IP address port and pushes IP sender addresses through on path 26 to the black list 29. This list is statically managed by a management application and contains entries which may be pushed down by an administrator who has made the decision that these IP addresses are likely to be used for a future DoS attack.

The ACL-Allow list 23 pushes IP sender addresses along path 27 to the white list 30 in the packet filter 13. This list is statically managed and contains IP addresses believed by an administrator to be unlikely to be the source of a DoS attack, and which may thus be pushed down by an administrative application.

The ACL-authorization list (ACL-Auth) 24 pushes IP sender address list entries along path 28 to the white list 30. Here the SIP authentications are used to dynamically manage the white list 30 since these incoming IP addresses are not believed to be a likely source for a DoS attack.

The packet filter layer 13 also has a rest list 31 whose individual list entries (represented by a plurality of boxes) are actually logical and are specified here only for architectural representation. This list contains entries in the universe of all possible IP addresses/ ports and other rules which are not specified in the black list or the white list.

Figure 3:
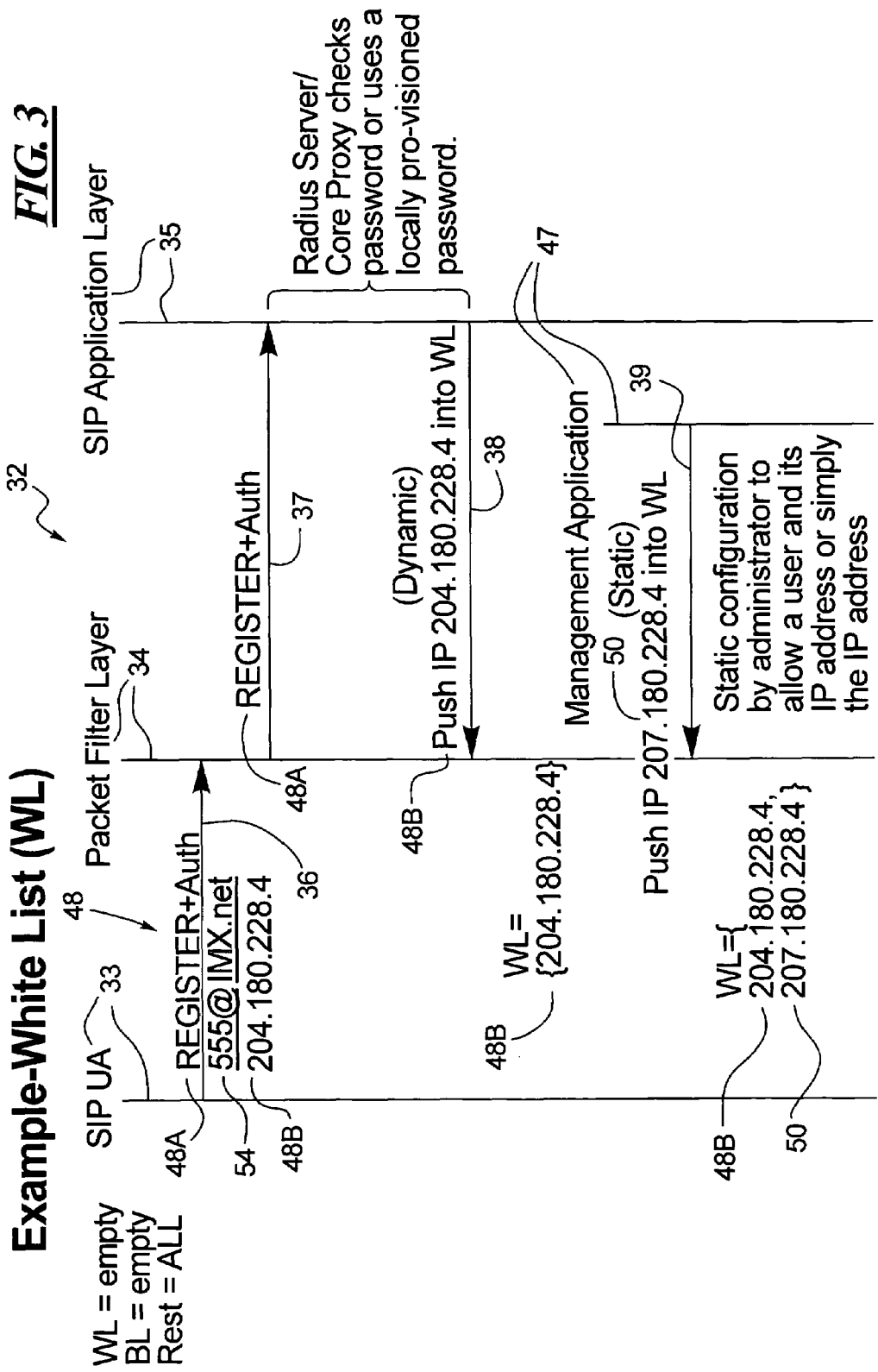
FIG. 3 is a diagram explaining how to set up the "White List" (WL) containing IP addresses which are determined to be an unlikely source for causing a DoS attack.

Creation and management of the white list (WL) is shown by dynamic and static examples illustrated by diagram 32 in FIG. 3. Here a first user agent (user) is registering his Address-of-Record (A-O-R) 54, that is the user's name and/or identification. Specifically, a REGISTER+Auth message packet 48 sent by the SIP first user agent (SIP UA) 33 is forwarded on path 36 to the packet filter layer 34. "REGISTER" represents the message used for registering by the user agent/sender. "Auth" represents the authorization or password for authentication. The registration packet 48 has packet information 48A, a VoIP A-O-R address (Address-of-Record) to be registered by the user 54, and a first Ip user/sender address 48B. The IP address may be represented as a domain name in the message as an alternative. The packet 48 is originated by the user agent to register the user A-O-R 555@IMX.net 54 with the SIP server (henceforth referred to as IMX.net or IMX for short). The SIP server is shown split into two layers—the packet filter layer 34 and the SIP application layer 35. "555" in the domain name address is an example of the user agent identification in the IMX.net domain hosted by the IMX.net server.

The packet filter layer 34 detects the incoming packet. Since it has no state, the policy executed is that specified in the "rest" category. The packet filter layer 34 then forwards the packet registration and authorization information 48A on path 37 first to the SIP session layer 20 (shown in FIG. 2). The SIP session layer 20 creates a session state as per the SIP specification (or if it is any other protocol, it runs its own state machines) and forwards the packet on path 37 to the SIP application layer 35 (FIG. 3). Here a Radius Server/Core Proxy checks the password or uses a locally pro-visioned password. The user may be authenticated using a password, a token or a biometric system. Thereafter the SIP application layer 35 pushes the IP sender address along path 38 into the white list at the packet filter layer 34 since this address was dynamically determined to be a valid IP sender/user address. Also a management application 47 is shown pushing a desired sender IP address 50 along path 39 to the packet filter layer 34. This is a static configuration by the administrator who has decided to allow a user/sender and its IP address or simply the IP address, since he believes it will not be a source for a DoS attack. Thus in this manner the white list (WL) is created, with both dynamic and static ways being shown to populate the white list.

Creation or population of the black list (BL) will now be explained with reference to FIG. 4 where examples are shown for dynamic and static populating the black list.

Figure 4:
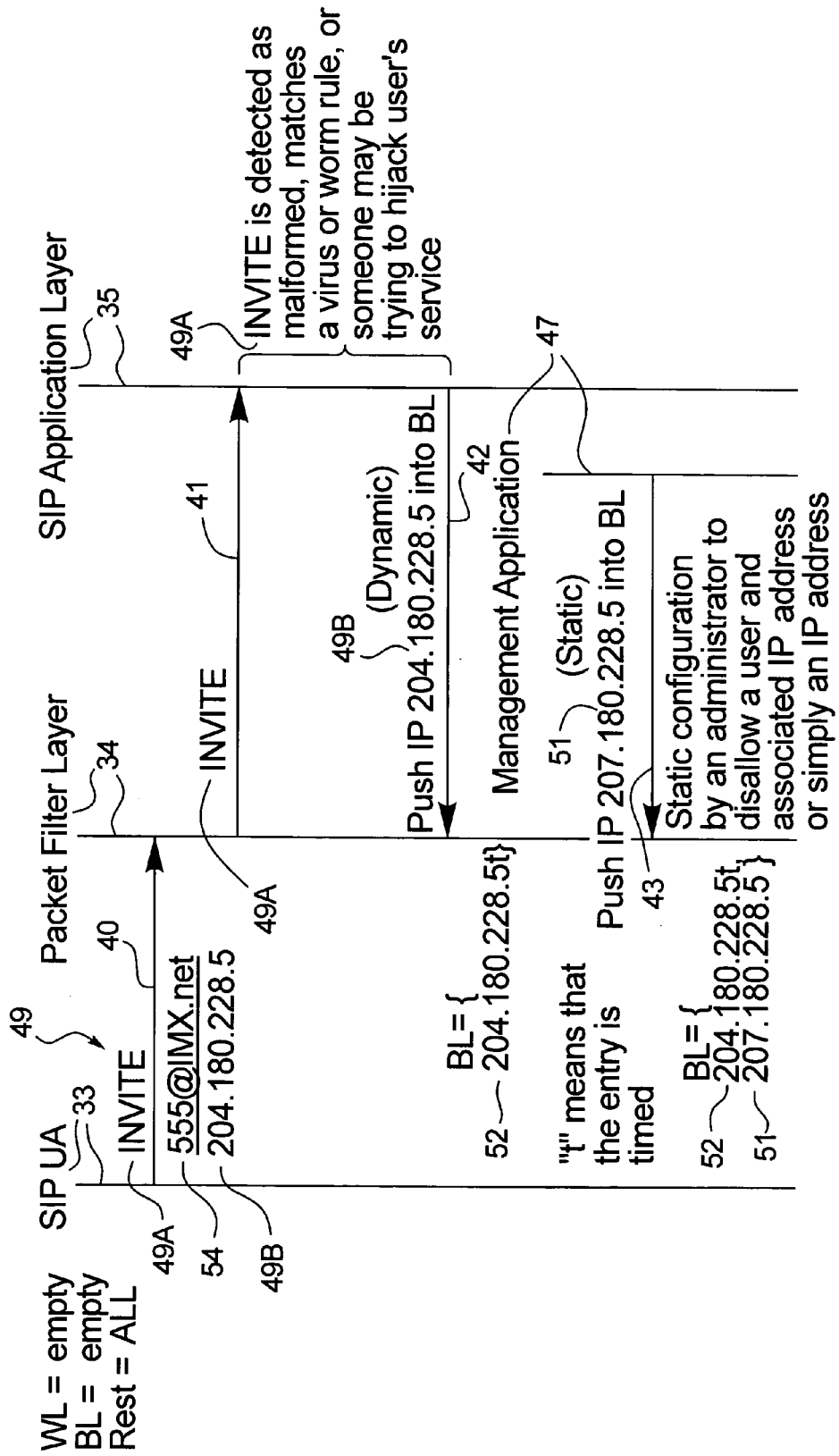
FIG. 4 is a diagram example for setting up the "Black List" (BL) for IP addresses which are determined to be a likely source for causing a DoS attack.

As shown in FIG. 4 a second user, from a second IP address different than the first is placing a phone call to the previously registered A-O-R 54 of the first user. This second SIP user agent 33 is sending an INVITE message packet 49 on path 40 to the packet filter layer 34. This packet contains packet information INVITE 49A, a VoIP system message that a phone call is being initiated, that is a message used in SIP to initiate the session. This information packet is being sent to the VoIP recipient A-O-R 54 registered by the first user from the sender's IP address 49B. The packet filter layer 34 in the server's domain first intercepts the packet. It detects that it does not have any state for the IP address 49B and thus executes the policy assigned to the "rest" category (typically allocating lower priority to processing this packet). It then sends the INVITE packet information 49A on path 41 to the SIP application layer 35. Here the INVITE packet information 49A is detected as malformed, as matching a virus or worm rule, or as someone trying to hijack the user's service. This detected DoS attack results in a dynamic pushback of the IP sender address 49B into the black list along path 42.

As a static example for populating the black list, a management application 47 pushes an IP address 51 of a sender/user to be disallowed into the black list. Thus, this is a static configuration by an administrator to disallow a user/sender and associated sender IP address or simply an IP address pushed along path 43 to the packet filter layer 34. Here the administrator has made a decision that this IP address may be the source for a future DoS attack.

The sender address 49B address 51 are converted to a timed entry 52 and is entered in the black list as the timed entry disallowed sender IP address 52 (timed entries are denoted by the suffix "t"). Thus in FIG. 4, the black list has IP sender address entries 52 and 51.

A DoS attack example will now be described with reference to the diagram of FIG. 5. In FIG. 5, first, second, and third incoming message packets 50, 49, and 53 are shown as exemplary. With packet information 50A for the first message packet 50, a phone call is being initiated from a third IP address but using the previously registered A-O-R 54 by the first user and which contains packet information INVITE 50A from A-O-R 54 being sent to A-O-R 54. It is transmitted along path 44 from SIP user agent 33 to packet filter layer 34. The INVITE packet information 50A from sender IP address 50B is detected during inspection to be part of the "rest" list, and may be subject to lower priority processing than the white list WL. In the worst case, it may be dropped during congestion while the INVITE packet information matching the white list may be simultaneously processed.

In FIG. 5, the second message packet 49 is instituting a phone call from the second IP address 49B to the previously registered A-O-R 54 with INVITE packet information 49A. It is sent along path 45 to the IMX packet filter layer 55. After inspection, this packet information INVITE 49A is dropped since the source (sender) IP address 49B specifically matches the previously dynamically entered black list entry.

In FIG. 5 the third exemplary message packet in 53 is instituting a phone call from the first IP address (original first user who registered) to another A-O-R 100. Here a message packet 53 with INVITE packet information 53A from sender IP address 48B to the different A-O-R 666@IMX.net 100 is being sent along path 46 to the IMX packet filter layer 55.

After inspection the INVITE packet information 53A is passed through to the IMX application layer 56 and the IMX application layer 56 applies the rate limiting after that.

Summarizing the above, both the white list and the black list are created and managed by the SIP application layer 35 (FIGS. 3 and 4). Entries in each list may be installed permanently or temporarily for blocks of time in a dynamic fashion as attacks are perceived by the application layer 35. An administrator through the management application 47 (FIGS. 3 and 4) may manually extend the timed blocks or delete them prematurely. The black list is used by the packet filter layer 34 to prevent further communications from potential attackers. Entries in the black list may be installed for defined time intervals. When this defined time interval (15 minutes, for example) is completed, then the black list blocking by the packet filter layer 34 for the endpoint (or rule) is disabled and no longer occurs. Thus, one malicious call will not tie up the system and service is restored without preventing normal calls in the future.

The dynamic nature of the pushdown allows prevention of a DoS attack despite a changing address during the attack.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for protecting against a denial of service attack at a higher layer of a communication network protocol stack, the method comprising:
   at the higher layer of the communication network protocol stack, wherein the higher layer is positioned above a session layer:
      receiving a plurality of packets containing packet information of the higher layer and racket information of a lower layer in the communication network protocol stack, wherein the lower layer is below the session layer;
      identifying, based on the packet information of the higher layer, a likely denial of service attack, wherein the denial of service attack is difficult to detect at the lower layer because source IP addresses of attack rackets vary during the denial of service attack; and
      in response to identifying a likely denial of service attack based on the packet information of the higher layer, dynamically mapping the packet information of the higher layer to packet information of the lower layer and populating the mapped packet information of the lower layer to a packet filter inspection layer positioned between the higher layer and the lower layer, wherein the racket filter inspection layer is positioned below an application layer and the session layer and positioned above a network layer and a transport layer; and
   at the packet filter inspection layer:
      receiving the dynamically mapped packet information of the lower layer; and
      selectively processing the packet using the packet information of the lower layer before the packet is received, from the lower layer, by a boundary of the session layer closest to the lower layer.

2. A method of claim 1 wherein after a predetermined time period, stopping selectively processing the packet.

3. A method of claim 2 wherein selectively processing the packet includes:
   creating a list of IP addresses deemed to constitute a likely source of a denial of service attack;
   inspecting an IP address of at least one of the plurality of packets to determine whether the IP address is on the list, and if it is on the list, stopping the incoming packet information from being sent to the higher layer; and
   after said predetermined time period, stopping use of the list to prevent packet information from being sent through to the higher layer.

4. A method of claim 3 wherein creating said list includes dynamically creating said list based on incoming registrations to an application from IP addresses which are responsible for a denial of service attack.

5. A method of claim 3 wherein creating said list includes creating said list by use of an administrator through a management application which provides IP addresses for placement on the list which the administrator deems to be likely source of a denial of service attack in the future.

6. A method of claim 3 wherein said list comprises a first list, and further including the step of creating a second list in the packet filter layer by use of the application layer of IP addresses deemed not to be a likely source of a denial of service attack by dynamically entering said IP addresses on the second list.

7. A method of claim 6 wherein the second list is also created by an administrator through an management application which enters IP addresses on the second list deemed unlikely by the administrator to be a source of denial of service attack.

8. A method of claim 6 including the step of using the application layer to create a rest list in the packet filter layer, said rest list having IP addresses thereon not contained in the first list and the second list and which are not deemed relevant IP addresses for determination of whether or not there is a denial of service attack.

9. A method of claim 6 wherein the packet filter layer uses the second list to send, through to the higher layer, received packet information from an IP address deemed not likely to be a source for a denial of service attack.

10. A method of claim 3 wherein the IP addresses in the list are converted to a timed entry by the packet filter inspection layer.

11. A method of claim 1 wherein selectively processing the packet includes creating a rule dynamically based on the packet profile.

12. A method of claim 11 wherein said rule is created dynamically without user intervention and by observing network information.

13. A method of claim 11 wherein said rule is created by use of an administrator through a management application.

14. A method of claim 1 wherein the communication network comprises a VoIP network.

15. A method of claim 1 wherein the higher layer comprises an SIP application layer.

16. A method of claim 1 wherein the packet filter layer is provided between a session layer and a transport layer.

17. A method of claim 1 wherein identifying a likely denial of service attack includes identifying a denial of service attack using only session layer packet information.

18. A method of claim 1 wherein identifying a likely denial of service attack includes identifying a denial of service attack using only application layer packet information.

19. A method of claim 1 wherein identifying a likely denial of service attack includes identifying a denial of service attack which can occur at both a session layer and an application layer.

20. A method of claim 1 wherein the higher layer dynamically creates entries of IP addresses in a list based on a registration of an address of record sent from a user, and the packet filter inspection layer decides whether or not to drop an incoming packet, which is an invitation for a communication path, based on whether or not the IP address of the incoming invitation packet is from an IP address which is on the list.

21. A method of claim 1 including provisioning a network layer beneath a transport layer.

22. A VoIP network communication device for responding to a denial of service attack at a higher layer of a communication network protocol stack, said communication network protocol stack also having a lower layer beneath the higher layer for receiving packet information from users, comprising:

a first hardware element of the VoIP network communication device for executing a higher layer of the communication network protocol stack for:

receiving, at the higher layer, a plurality of packets containing packet information of the higher layer and packet information of the lower layer, wherein the lower layer is below the session layer in the communication network protocol stack;

identifying, based on the packet information of the higher layer, a likely denial of service attack, wherein the denial of service attack is difficult to detect at the lower layer because source IP addresses of attack rackets vary during the denial of service attack; and in response to identifying a likely denial of service attack based on the racket information of the higher layer, dynamically mapping the packet information of the higher layer to packet information of the lower layer and populating the mapped packet information of the lower layer to a packet filter inspection layer positioned between the higher layer and the lower layer, wherein the packet filter inspection layer is positioned below an application and a session layer of the communication network protocol stack and positioned above a network and a transport layer of the communication network protocol stack; and a second hardware element of the VoIP network communication device for executing a packet filter layer, wherein the racket filter inspection layer is positioned below an application layer and the session layer and positioned above a network layer and a transport layer, the packet filter layer for:

receiving the dynamically mapped packet information of the lower layer;

creating a rule in the packet filter layer to identify a likely denial of service attack by use of the application layer, where the application layer is associated with or comprises said higher layer;

inspecting incoming packet information of the higher layer to determine whether it is a likely denial of service attack; and in response to determining a likely denial of service attack, selectively processing the packet using the packet information of the lower layer before the racket is received, from the lower layer, at a boundary of the session layer closest to the lower layer.

23. A VoIP network communication device of claim 22 wherein after a predetermined time period, the packet filter layer stops use of the rule to prevent packet information from being sent through to the application layer.

24. A VoIP network communication device of claim 22 wherein said rule comprises a list in the packet filter layer of IP addresses deemed to constitute a likely source of a denial of service attack;

the packet filter inspection layer inspecting an IP address of the incoming packet information to determine whether the IP address is on the list, and if it is on the list, stopping the incoming packet information from being sent to the application layer; and after said predetermined time period, said packet filter inspection layer stops use of the list to prevent packet information from being sent through to the application layer.

25. A VoIP network communication device of claim 22 including said rule being created dynamically.

26. A VoIP network communication device of claim 25 wherein said rule is created dynamically without user intervention and by observing network information.

27. A VoIP network communication device of claim 22 including said rule being created by use of an administrator through a management application.

28. A VoIP network communication device of claim 22 wherein the communication network comprises a VoIP network.

29. A VoIP network communication device of claim 22 wherein the packet filter layer is provided between a session layer and a transport layer.

30. A VoIP network communication device of claim 22 wherein the device includes a session border controller (SBC).

31. A VoIP network communication device of claim 22 wherein the device includes a SIP server.

\* \* \* \* \*